United States Patent [19]
Horikawa

[11] Patent Number: 5,608,866
[45] Date of Patent: Mar. 4, 1997

[54] SYSTEM FOR MEASURING AND ANALYZING OPERATION OF INFORMATION PROCESSOR

[75] Inventor: Takashi Horikawa, Tokyo, Japan

[73] Assignee: NEC Corporation, Tokyo, Japan

[21] Appl. No.: 419,238

[22] Filed: Apr. 10, 1995

[30] Foreign Application Priority Data

Apr. 8, 1994 [JP] Japan .................................. 6-070629

[51] Int. Cl.⁶ .................................................. G06F 11/28
[52] U.S. Cl. ................................ 395/183.15; 395/183.16
[58] Field of Search ...................... 364/DIG. 1, DIG. 2; 395/180, 182.08, 183.01, 183.03, 183.06, 183.08, 183.11, 183.14, 183.15, 375, 800

[56] References Cited

FOREIGN PATENT DOCUMENTS

| | | |
|---|---|---|
| 62-264342 | 11/1987 | Japan . |
| 63-91752 | 4/1988 | Japan . |
| 63-276638 | 11/1988 | Japan . |
| 2-139644 | 5/1990 | Japan . |
| 2-173841 | 5/1990 | Japan . |

OTHER PUBLICATIONS

Heidelberger et al., *Computer Performance Evaluation Methodolgoy*, IEEE Transactions on Computers, 1984, vol. C–33, No. 12, pp. 1195–1220.

Razouk et al, *Measuring Operating System Performance on Modern Micro–Processors*, Proceedings of 1986 ACM Sigmetrics Conference, Measuring and Modeling Computer System, vol. 14, pp. 193–202.

*Primary Examiner*—Robert B. Harrell
*Attorney, Agent, or Firm*—Foley & Lardner

[57] ABSTRACT

A system for measuring and analyzing operation of an information processor which measures an interval of occurrences of a software event as a measuring object in a measuring object information processor by using a measuring and analyzing information processor. The measuring object information processor outputs data information on a software event, address information of the data information and a write indication signal of the data information and the address information to the measuring and analyzing information processor in response to execution of a predetermined software probe activated by the occurrence of the measuring object software event. The measuring and analyzing information processor alternately writes the data information and the address information together with time information, as measurement data, in a plurality of buffers in response to the write indication signal, as well as reading the measurement data written in the buffers to store the measurement data in a magnetic disk device in time series order.

14 Claims, 7 Drawing Sheets

SYSTEM FOR MEASURING AND ANALYZING OPERATION OF INFORMATION PROCESSOR

BACKGROUND OF THE INVENTION

1. Field of the Invention

The present invention relates to measuring and analyzing systems for examining operation of information processors and, more particularly, devices for measuring and analyzing operation of an information processor as a measuring object by measuring an elapsed time from when a software event to be measured occurs until another software event occurs in the information processor.

2. Description of the Related Art

Measuring devices which examine the state of operation of an information processor are roughly classified into 1) hardware monitor, 2) software monitor and 3) hybrid monitor as recited in, "Computer Performance Evaluation Methodology, Transactions on Computers", Vol. c-33, No. 12, Dec. 19, 1984.

There are the following two kinds of results obtained by measurement:

1) trace data which records operation of a computer as time series data;
2) resultant data regarding a target performance evaluation item such as execution time of a specific procedure.

In general, once trace data of enough length is acquired, various kinds of performance evaluation data can be obtained by analyzing the trace data. For evaluating performance of a computer, it is therefore more desirable to obtain trace data.

One example of a system for evaluating performance of a computer based on trace data collected through measurement is disclosed in Japanese Patent Laying-Open No. 2-173841, entitled "Program Execution Time Measuring System". Although no specific means of obtaining traces is recited in this literature, any of the following problems generally occurs in obtaining such traces of instructions as described herein.

1) An overhead in measurement is increased.
2) An expensive measuring device is required.

A hardware monitor is a measuring device with a high impedance hardware probe connected to a computer to be measured for examining operation of the computer, which operation appears as a hardware signal. Because this device simply monitors a hardware signal of the measuring object computer externally, it is not at all necessary to modify software of the target computer to change operation of the same for the measurement. Measurement using a hardware monitor is therefore characterized in that an actual state of operation of a target computer can be accurately measured without disturbing operation of the computer as a measuring object. This is a great advantage that other monitors lack.

On the other hand, some hardware monitors are incapable of directly detecting a software event, such as switching of a process, which is not externally output as a hardware signal. As far as such a software event is concerned, a hardware monitor has a drawback that it can neither measure nor evaluate a software event by itself.

One example of such hardware monitors is disclosed in Japanese Patent Laying-Open No. 63-91752, entitled "System for Evaluating and Measuring Performance of Electronic Computer", which is a monitor whose objective is to obtain various kinds of performance evaluation measurement data by using a memory to be employed in a history recording mode, but not a device for obtaining trace data.

Japanese Patent Laying-Open No. 63-276638, entitled "Software Development Supporting Device", recites a device capable of gathering data indicative of a history of software execution by using hardware. This device, however, costs much because of a storage circuit equivalent to a storage device (memory) of an electronic computer used as a medium for recording a history. This device has another disadvantage that it is incapable of accurately collecting execution histories of repetitious executions of a program having the same address.

On the other hand, a software monitor is a device for examining operation of a computer to be measured by means of a software probe. The software probe is implemented by incorporating a probe instruction sequence for the operation of "extracting and recording information necessary for measurement and evaluation from a computer to be measured" in a machine language instruction sequence of a target computer (to be specifically, OS or application). There is another kind of probe implemented as a microcode instruction sequence incorporated into microcode instructions but not as a machine language instruction sequence. This kind of probe is called "microcode probe" in some instances but can be treated as a software probe in a broad sense.

Software probes are roughly classified into an event-driven type and a timer-driven type according to conditions activating a probe instruction sequence. The event-driven type is a system activated by the generation of an event to be measured (such as memory access and execution of an instruction).

The timer-driven type is a system activated at fixed time intervals by a clock interrupt etc. and is called as a sampling system. Some measurement employs a combination of event-driven and timer-driven probes.

Because of being an instruction sequence incorporated into software of a computer to be measured, the software probe has an advantage of its capability of examining contents of a memory or a register at an arbitrary address at an arbitrary time point, that is, examining software-related information. The software probe can therefore detect a software event with ease.

On the contrary, because during the execution of a probe instruction sequence, a computer as a measuring object is to execute an instruction whose execution is not originally needed, more time is required for the execution of a program than for the execution of an instruction sequence incorporating no software probe. In other words, the software probe has a shortcoming of generation of an overhead in measurement.

In general, an overhead in measurement is increased as the contents of operation conducted in a probe are more complicated and a time interval activating the probe becomes shorter.

An example of a system for measuring performance of a computer system which executes multitasking interactive processing by using this software probe is disclosed in Japanese Patent Laying-Open No. 2-139644, entitled "Computer System". This system performs measurement only by means of software and stores measurement data in a memory of a system to be measured and therefore involves the following problems.

1) When in examining in detail operation of a system to be measured, that is, when a software probe activation time becomes short, an overhead in measurement is increased.
2) Shortage of a memory capacity of a computer to be measured might adversely affect execution of a program to be measured.
3) Measurement is possible only for a short period of time until the completion of write of measurement data into a memory region ensured for recording the measurement data.

In addition, an event-driven software probe generally uses a timer which is under control of an operating device and whose precision is on the order of 10 mS for checking a current time, that is, a time of occurrence of a software event detected by the software probe. The precision of the obtained time accordingly depends on that of the timer.

On the other hand, because the timer-driven software probe is activated by clock interrupt occurring asynchronously with software operation inside a computer to be measured, it can not detect a software event, such as switching of a process, which occurs synchronously with software operation inside the computer. As a result, it is impossible by this type of software probe to obtain time of software event occurrence and an elapsed time from occurrence of one software event until that of another.

A hybrid monitor is a measuring device which employs both a hardware probe and a software probe together. A function of the software probe in this measuring device is to detect a software event and write it in a specific hardware resource, which is to convert a software event into a hardware event.

A function of the hardware probe is to monitor such a hardware event as described above and record it together with a necessary hardware signal as time series data. As compared with a software monitor requiring operation of detecting a software event and recording it as measurement data by a software probe, the hybrid monitor system which requires no recording operation has less overhead of the software probe.

Japanese Patent Laying-Open No. 62-264342, entitled "Device for Measuring Load on Computer", recites one example of a device for obtaining performance evaluation data by means of both software and hardware. To be obtained by the device is a numerical value indicative of load on a computer but not trace data.

An example of a hybrid monitor using a logic analyzer as a hardware probe and a device for recording time series data is disclosed in "Measuring Operating System Performance on Modern Micro-Processors, Performance Evaluation Review", Vol. 14, Proceedings of 1986 ACM SIGMETRICS Conference, Measuring and Modeling Computer System, pp. 193–202. A common logic analyzer employs a semiconductor memory as a recording device for the recording of time series data. This makes a time series data recording device cost more and as well as making a volume of recordable time series data be limited by a capacity of the semiconductor memory.

With a volume of measurable data being limited by a semiconductor memory capacity, a conventional hybrid monitor, which employs such a hardware tool as a logic analyzer using a semiconductor memory as a device for recording time series data, is not allowed to record operation of a computer over a long period of time.

Among conventional systems for measuring and analyzing operation of information processors, a hardware monitor has a disadvantage that it is not capable of detecting a software event to examine software operation.

A software monitor which collects sample data through sampling has a problem of incapability of measurement of a time elapsed from one software event until another. On the other hand, a software monitor which acquires a time series of software events has the following drawbacks.

1) A large measurement overhead disturbs operation of a device to be measured.

2) Because event occurrence time is ordinarily detected by a timer under control of an OS, precision of the detected time, which is on the order of 10 mS, is insufficient.

As to a conventional hybrid monitor, because of a semiconductor memory employed as a recording device for use as a time series data recording device, the time series data recording device costs much, and a limited capacity of the memory reduces a volume of data recordable in the time series data recording device. As a result, recording of a long-time operation of a computer is impossible.

SUMMARY OF THE INVENTION

An object of the present invention is to provide an information processor operation measuring and analyzing system which is capable of solving the foregoing problems of conventional measuring and analyzing systems and acquiring software operation of an information processor as a measuring object over a long period of time, that is, gathering a time series of software events with reduced overhead.

Another object of the present invention is to provide an information processor operation measuring and analyzing system which can be realized at low cost and is capable of detecting a time of software event occurrence and a time elapsed between one software event and another with high precision.

According to one aspect of the invention, in an information processor operation measuring and analyzing system which measures an interval of occurrences of a software event as a measuring object in an information processor as a measuring object by using a measuring and analyzing information processor, said measuring object information processor comprising:

means responsive to execution of a predetermined software probe incorporated in a software in response to the occurrence of said measuring object software event in the software for outputting data information on said software event, address information of the data information and a write indication signal for indicating write of said data information and address information; and said measuring and analyzing information processor comprising:

a plurality of buffers for storing said data information and address information together with time information as measurement data;

write control means for writing said measurement data into said plurality of buffers in response to said write indication signal;

measurement data storage means for storing the measurement data written in said buffers in time series order; and transfer control means for reading out measurement data of said buffer write to which is completed and transferring the same to said measurement data storage means.

In the preferred construction, the measuring object information processor comprises hardware to which information indicative of a start and an end of said software event and information necessary for checking activation conditions, the state of execution and execution results of said software is written as said data information in response to execution of said software probe, said output means outputting said data information written in said hardware and a write address to said hardware as said address information, and the measuring and analyzing information processor comprises clock counter means for outputting time information to be a time stamp of said data information and address information.

Also, the output means of said measuring object information processor comprises means for detecting a write address to said hardware generated by the execution of said software probe, and means for indicating write of said data information and said write address to said hardware, and said output means outputs said data information and said write address written in said hardware and a write indication signal generated by said write indication means.

In the preferred construction, the measuring and analyzing information processor comprises holding means for holding a flag indicating whether write of said measurement data is completed or not for each of said plurality of buffers, said write control means writes said measurement data to said buffer write to which is not yet completed and sets said flag corresponding to said buffer write to which is completed to the write completion state with reference to said flag for each of said buffers, and said transfer control means reads said measurement data from said buffer in the write completion state and sets said flag corresponding to said buffer from which said measurement data reading is completed to the write incompletion state with reference to said flag for each of said buffers.

In the preferred construction, the measuring and analyzing information processor comprises switching means for alternately switching said buffer to which said measurement data is to be written by said write control means and said buffer from which said measurement data is to be read by said transfer control means, and said write control means comprises switching control means for switching said switching means of said buffer having its corresponding flag in the measurement data reading incompletion state to the write side of said measurement data and switching said switching means of said buffer having its corresponding flag in the measurement data writing completion state to the read side of said measurement data.

Also, the write control means of said measuring and analyzing information processor comprises detection means for detecting write addresses to said buffer to which said measurement data is written being counted up to the end, said count-up detection means, upon detecting count-up to the end of write addresses of said buffer to which said measurement data is written, setting said flag corresponding to said buffer to the write completion state, and said transfer control means of said measuring and analyzing information processor comprises detection means for detecting read addresses to said buffer from which said measurement data is read being counted up to the end, said count-up detection means, upon detecting count-up to the end of read addresses of said buffer from which said measurement data is read, setting said flag corresponding to said buffer to the write incompletion state.

In the preferred construction, the write control means of said measuring and analyzing information processor comprises:

address counting means for counting up write addresses of said measurement data to said buffer in response to said write indication signal, and count-up detection means for detecting the write address to said buffer being counted up to the end to set said flag corresponding to said buffer to the write completion state, said transfer control means of said measuring and analyzing information processor comprises:

address counting means for counting up read addresses of said measurement data to said buffer, and count-up detection means for detecting the read addresses to said buffer being counted up to the end to set said flag corresponding to said buffer to the write incompletion state.

According to another aspect of the invention, in an information processor operation measuring and analyzing system which measures an interval of occurrences of a software event as a measuring object in an information processor as a measuring object by using a measuring and analyzing information processor, said measuring object information processor comprising:

means responsive to execution of a predetermined software probe incorporated in a software in response to the occurrence of said measuring object software event in the software for outputting data information on said software event, address information of the data information and a write indication signal for indicating write of said data information and address information, and said measuring and analyzing information processor comprising:

a plurality of first buffers for storing said data information and address information together with time information as measurement data, write control means for writing said measurement data into said plurality of fist buffers in response to said write indication signal, a plurality of second buffers for storing said measurement data read from said first buffers, transfer control means for reading measurement data of said first buffer write to which is completed to transfer the read measurement data to said second buffer, measurement data storage means for writing and storing, in time series order, said measurement data transferred to said second buffer, wherein write of said measurement data to said first buffer, transfer of said measurement data from said first buffer to said second buffer, and write of said measurement data from said second buffer to said measurement data storage means are executed in parallel to each other.

In the preferred construction, the measuring object information processor comprises hardware to which information indicative of a start and an end of said software event and information necessary for checking activation conditions, the state of execution and execution results of said software is written as said data information in response to execution of said software probe, said output means outputting said data information written in said hardware and a write address to said hardware as said address information, and said measuring and analyzing information processor comprises clock counter means for outputting time information to be a time stamp of said data information and address information.

Also, the output means of said measuring object information processor comprises:

means for detecting a write address to said hardware generated by the execution of said software probe, and means for indicating write of said data information and said write address to said hardware, and said output means outputs said data information and said write address written in said hardware and a write indication signal generated by said write indication means.

In the preferred construction, the measuring and analyzing information processor comprises holding means for holding a flag indicating whether write of said measurement data is completed or not for each of said plurality of first buffers, said write control means writes said measurement data to said first buffer write to which is not yet completed and sets said flag corresponding to said first buffer write to which is completed to the write completion state with reference to said flag for each of said first buffers, and said transfer control means reads said measurement data from said first buffer in the write completion state and sets said flag corresponding to said buffer from which said measurement data reading is completed to the write incompletion state with reference to said flag for each of said first buffers.

Also, the measuring and analyzing information processor comprises switching means for alternately switching said first buffer to which said measurement data is to be written by said write control means and said first buffer from which said measurement data is to be read by said transfer control means, and said write control means comprises switching control means for switching said switching means of said first buffer having its corresponding flag in the measurement data reading incompletion state to the write side of said measurement data and switching said switching means of said first buffer having its corresponding flag in the measurement data writing completion state to the read side of said measurement data.

In the preferred construction, the write control means of said measuring and analyzing information processor comprises detection means for detecting write addresses to said first buffer to which said measurement data is written being counted up to the end, said count-up detection means, upon detecting count-up to the end of write addresses of said buffer to which said measurement data is written, setting said flag corresponding to said first buffer to the write completion state, and said transfer control means of said measuring and analyzing information processor comprises detection means for detecting read addresses to said first buffer from which said measurement data is read being counted up to the end, said count-up detection means, upon detecting count-up to the end of read addresses of said first buffer from which said measurement data is read, setting said flag corresponding to said buffer to the write incompletion state.

Also, the write control means of said measuring and analyzing information processor comprises:

address counting means for counting up write addresses of said measurement data to said first buffer in response to said write indication signal, and count-up detection means for detecting the write addresses to said first buffer being counted up to the end to set said flag corresponding to said first buffer to the write completion state, said transfer control means of said measuring and analyzing information processor comprises:

address counting means for counting up read addresses of said measurement data to said first buffer, count-up detection means for detecting the read addresses to said buffer being counted up to the end to set said flag corresponding to said first buffer to the write incompletion state.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings:

FIG. 3 is an illustration of software with no software probe incorporated in.

DESCRIPTION OF THE PREFERRED EMBODIMENT

Figure 1:
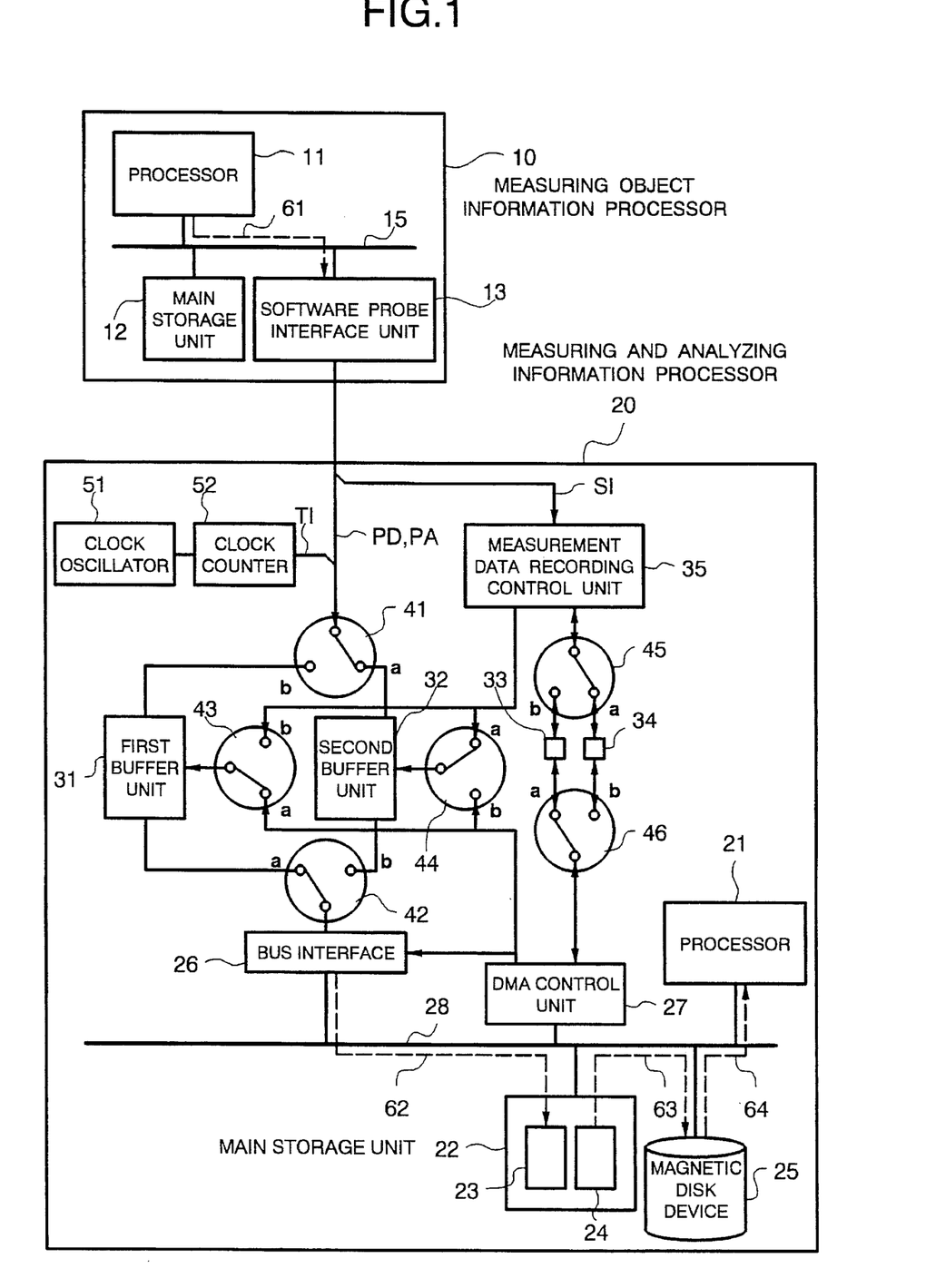
FIG. 1 is a block diagram showing an arrangement of a system for measuring and analyzing operation of an information processor according to one embodiment of the present invention.

A preferred embodiment of the present invention will be described in detail with reference to accompanying drawings. FIG. 1 is a block diagram showing an arrangement of a system for measuring and analyzing operation of an information processor according to one embodiment of the present invention. In FIG. 1, the information processor operation measuring and analyzing system is comprised of a measuring object information processor 10 and a measuring and analyzing information processor 20.

The measuring object information processor 10 comprises a processor 11, a main storage unit 12 connected to the processor 11 via a bus 15, and a software probe interface unit 13.

The measuring and analyzing information processor 20 comprises a processor 21, a main storage unit 22, a magnetic disk device 25, a bus interface 26, a DMA control unit 27, a first buffer unit 31, a second buffer unit 32, a first buffer unit status flag 33, a second buffer unit status flag 34, a measurement data recording control unit 35, a transfer destination change-over switch 41, a read source change-over switch 42, a first address change-over switch 43, a second address change-over switch 44, a write side flag change-over switch 45, a read side flag change-over switch 46, a clock oscillator 51, and a clock counter 52.

Figure 2:
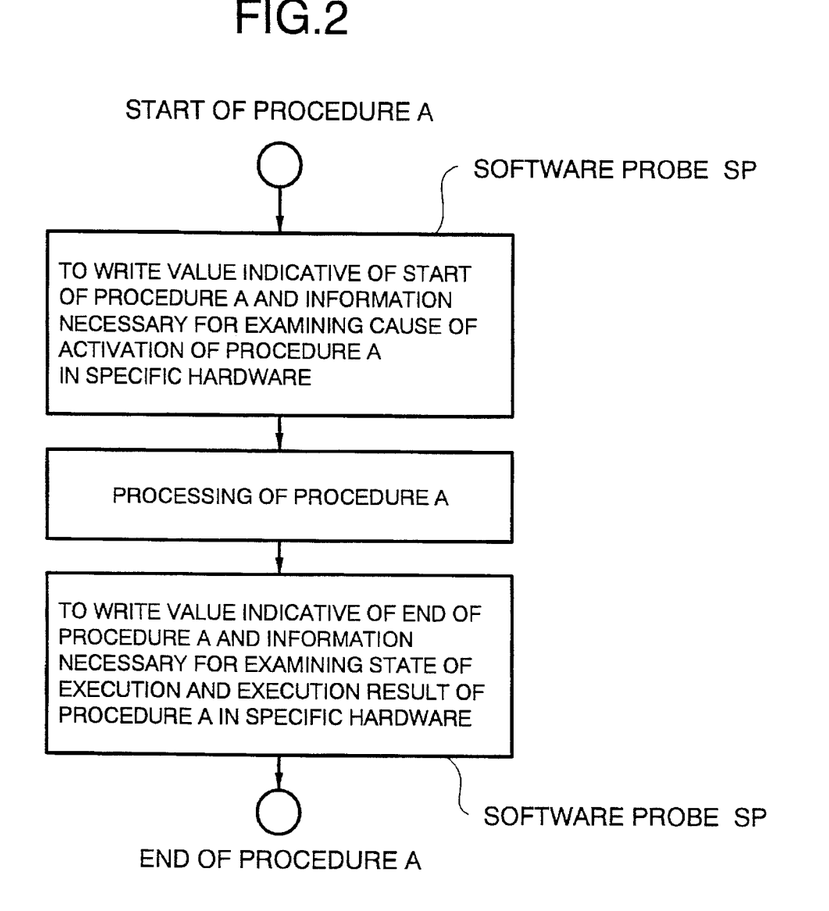
FIG. 2 is a diagram showing an example of software incorporating a software probe installed in an information processor to be measured.
Figure 3:
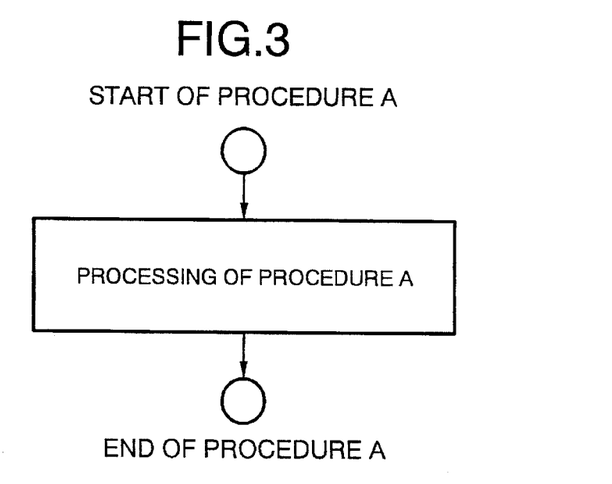

According to the present embodiment, in the software stored in the main storage unit 12 of the measuring object information processor 10, such a software probe SP as illustrated in FIG. 2 is incorporated in every procedure to be executed when each software event as a measuring object occurs. Shown in FIG. 3 is an example of software incorporating no software probe, which software is to be installed in the measuring object information processor 10 at the time of ordinary execution when no measurement is performed.

Following this software probe SP, a value indicative of a start of execution of a predetermined procedure A and a value indicative of an end of execution of the procedure A, and information necessary for examining in detail a cause of activation of the procedure A and information necessary for examining in detail an execution result of the procedure A are written in the software probe interface unit 13 through a writing path 61 at the start and end of the execution of the procedure A.

According to the software probe SP of the present embodiment, the former information, that is, the values indicative of a start and an end of execution of the procedure A, and the latter information, that is, the information necessary for examining in detail a cause of activation of the execution and an execution result of the procedure A, are written at different addresses in order to distinguish one from the other. As a result, by also recording address information of specific hardware written by the software probe SP as a part of measurement data, an analysis program is allowed to discriminate the former information from the latter based on address information.

When a measuring object program is executed, with the software probe SP illustrated in FIG. 2 incorporated in the software of the measuring object information processor 10, occurrence of such software events as a start and an end of execution of the procedure A causes the software probe SP to activate write to the software probe interface unit 13 prepared as specific hardware.

Figure 4:
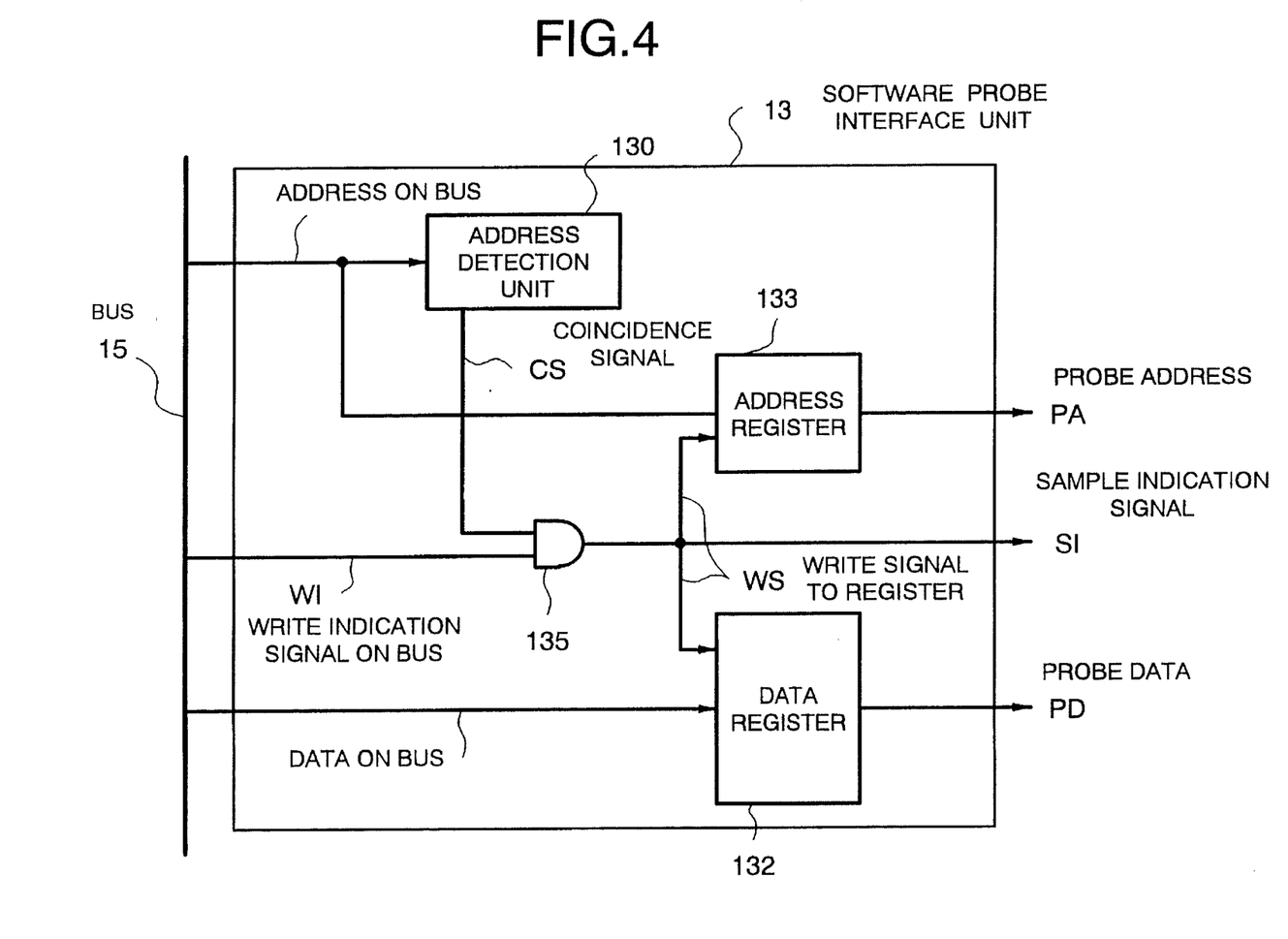
FIG. 4 is a block diagram showing an arrangement of a software probe interface unit in the information processor operation measuring and analyzing system shown in FIG. 1.

The arrangement of the software probe interface 13 is illustrated in FIG. 4. In FIG. 4, the software probe interface unit 13 comprises an address detection unit 130, a data register 132, an address register 133 and an AND gate 135.

The address detection unit 130 constantly monitors addresses on the bus 15 in the measuring object information processor 10 and enables a coincidence signal CS when an address of the specific hardware prepared for the software probe SP is output to the bus 15. Then, the coincidence signal CS and a write indication signal WI on the bus 15 are ANDed by the AND gate 135 to generate a write signal WS to the address register 133 and the data register 132.

In response to the write signal WS, data and an address output onto the bus 15 are accepted by the address register 133 and the data register 132 and externally output as probe data PD and probe address PA.

The write signal WS output from the AND gate 135 to the address register 133 and the data register 132 is externally output as a sample indication signal SI.

The foregoing processing results in that data and writing destination addresses written by the software probe SP are output as the probe data PD and the probe address PA together with the sample indication signal SI outside the measuring object information processor 10. Although FIG. 4 shows the arrangement, as an example, in which two registers for holding data and addresses are provided, other arrangement will be readily inferred in which probe data and probe addresses are directly written into a buffer unit on the side of the measuring and analyzing information processor 20 in response to a sample indication signal and no register is provided on the side of the measuring object information processor 10.

According to processing set forth below, the measuring and analyzing information processor 20, in response to the sample indication signal SI, records the probe data PD and the probe address PA output from the measuring object information processor 10 in the above-described processing.

In the following, processing operation will be described in a case where the change-over switches 41 to 46 of the measuring and analyzing information processor 20 are all set to the "a" side, which switches are the measurement data transfer destination change-over switch 41, the measurement data read source change-over switch 42, the address change-over switch 43 of the first buffer unit 31, the address change-over switch 44 of the second buffer unit 32, the write side flag change-over switch 45 of the buffer unit status flags 33 and 34, and the read side flag change-over switch 46 of the buffer unit status flags 33 and 34.

The probe data PD and the probe address PA output from the measuring object information processor 10 is input, together with time stamp information TI from the clock counter 52 counted up by the clock output from the clock oscillator 51, as measurement data to the second buffer unit 32 through the transfer destination change-over switch 41. The clock oscillator 51 which counts up the clock counter 52 and the sample indication signal Si are asynchronous with each other.

In such data measurement as described above, it is a common practice to represent time stamp information by gray codes so that two or more bits are not changed at the same time in the time stamp information expressed as a bit string. The clock counter 52 in the present embodiment also adopts gray codes.

Figure 5:
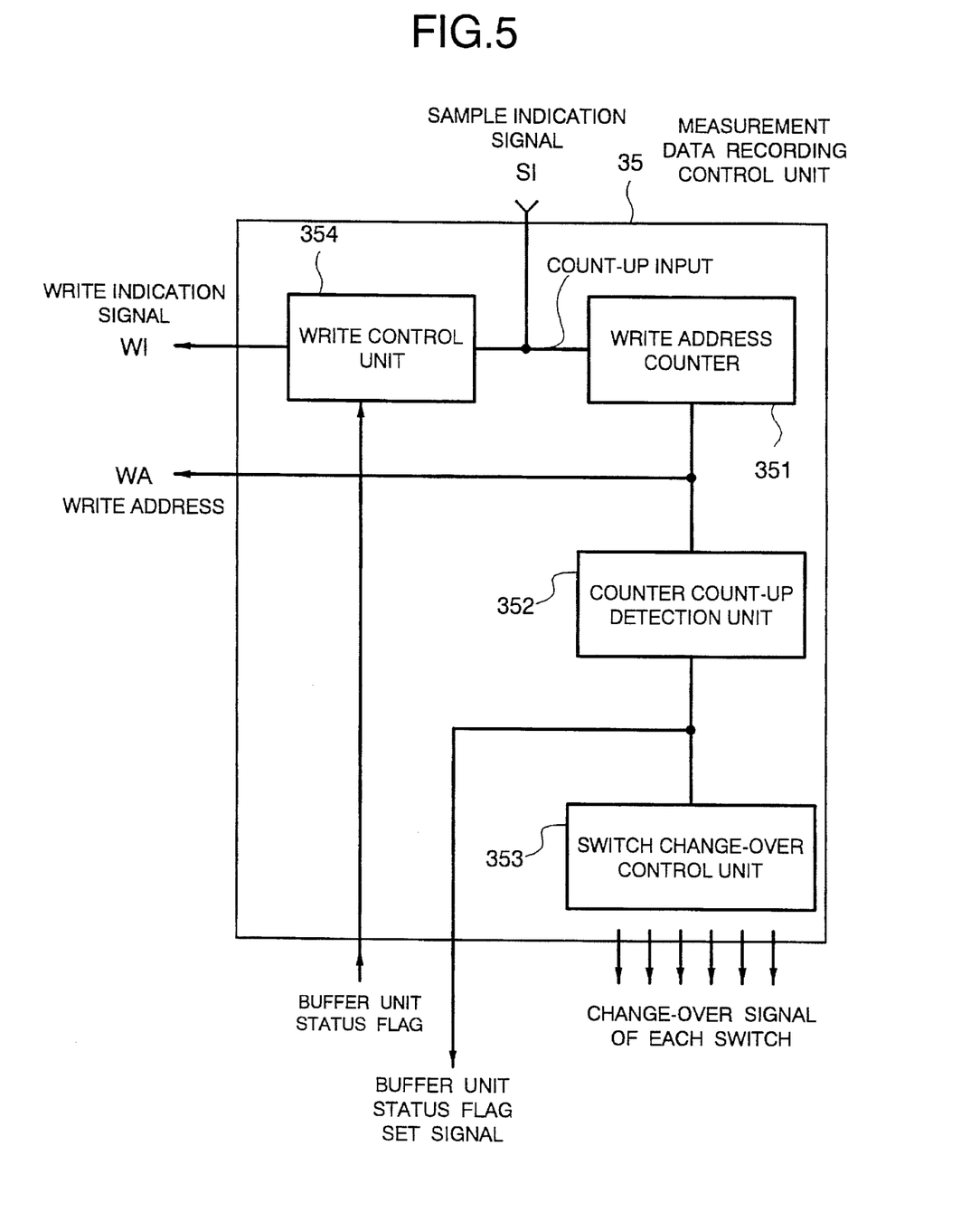
FIG. 5 is a block diagram showing an arrangement of a measurement data recording control unit in the information processor operation measuring and analyzing system shown in FIG. 1.

The sample indication signal SI output from the measuring object information processor 10 is input to the measurement data recording control unit 35, whose arrangement is illustrated in FIG. 5.

The measurement data recording control unit 35 contains a write address counter 351 to be counted up by the input of the sample indication signal SI as a count-up signal, a counter count-up detection unit 352 for detecting addresses of the write address counter 351 being counted up, a switch change-over control unit 353 for controlling the change-over switches 41 to 46 and a write control unit 354 for monitoring the buffer unit status flags 33 and 34 to determine whether write to the first buffer unit 31 or the second buffer unit 32 is made or not. The counter count-up detection unit 352 detects addresses being counted up to the end when an address of the write address counter 351 coincides with the ceiling value of the addresses of the buffer units 31 and 32.

Figure 6:
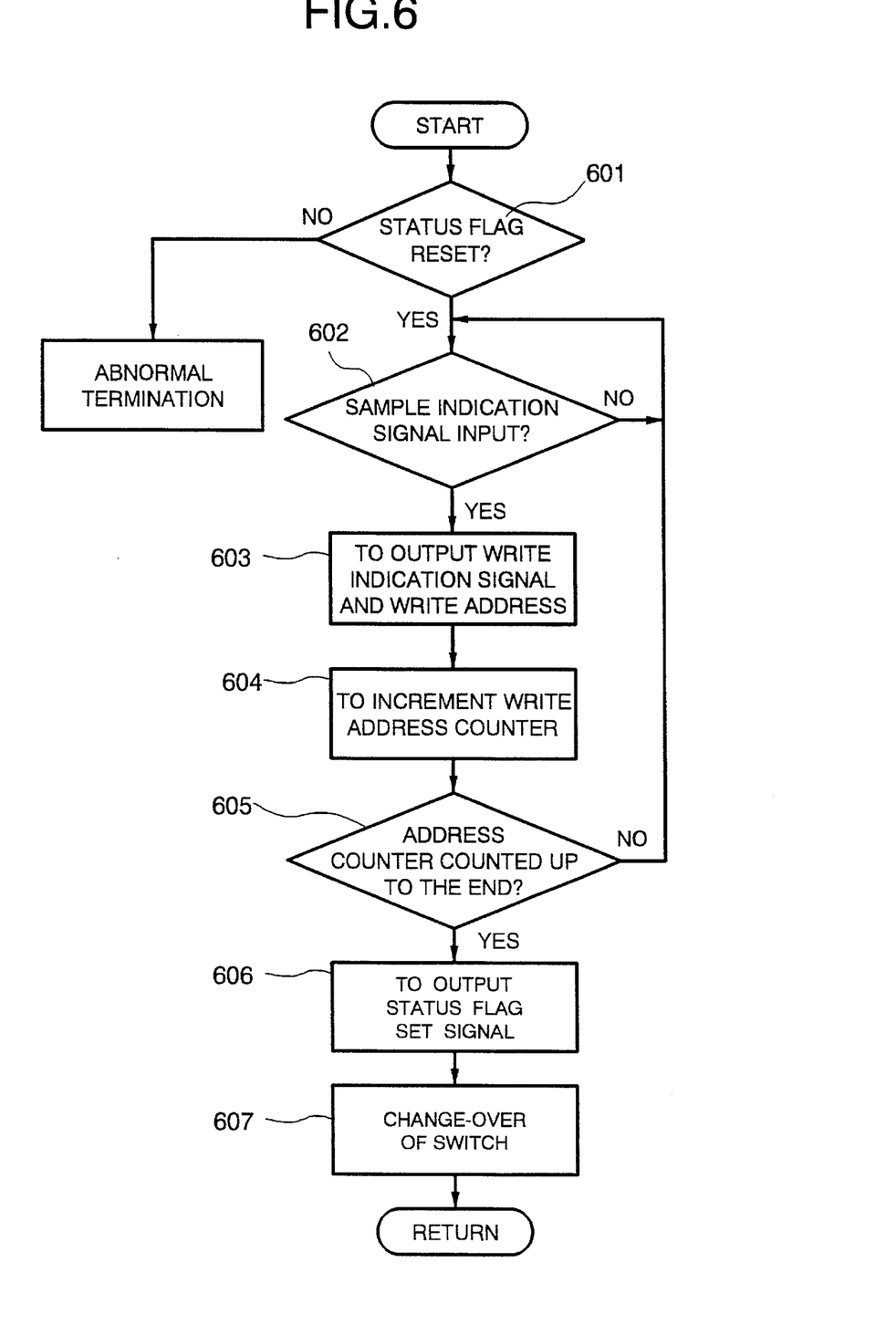
FIG. 6 is a flow chart illustrating operation of the measurement data recording control unit in the information processor operation measuring and analyzing system shown in FIG. 1.

With reference to FIG. 6 illustrating a flow chart of processing by the above measurement data recording control unit 35, description will be given of processing conducted by the measurement data recording control unit 35 to control measurement data (data comprised of probe data PD, probe address PA and time stamp information TI) writing to the buffer unit.

First, with the flag change-over switch 45 being switched to the "a" side, the write control unit 354 determines whether the buffer status flag 34 is in the reset state or not (Step 601). When the flag is not in the reset state, processing terminates abnormally.

When the buffer status flag 34 is in the reset state, the write control unit 354 queues for an input of the sample indication signal SI (Step 602). With the respective change-over switches 41 to 46 being switched to the "a" side in the state shown in FIG. 1, upon input of the sample indication signal SI, the sample indication signal SI having passed through the write control unit 354 is sent as a write indication signal WI to the second buffer unit 32, while an address output from the write address counter 351 is sent as a write address WA to the second buffer unit 32 via the address change-over switch 44 (Step 603).

The write control unit 354 has a function of outputting a sample indication signal SI, which is output from the measuring object information processor 10, to the second buffer unit 32 as a write indication signal WS when the second buffer status flag 34 applied through the write side flag change-over switch 45 of the buffer unit status flag is reset.

In response to the write indication signal WI, the second buffer unit 32 records the probe data PD, the probe address PA and the time stamp information TI from the clock counter 52 at a storage position designated by the write address WA. The sample indication signal SI output from the measuring object information processor 10 is also used as a count-up signal of the write address counter 351 in addition to a write indication signal WI to the buffer unit. This results in that an address of the write address counter 351 is counted every time measurement data is written in the buffer unit (Step 604), whereby each measurement data is sequentially written in the buffer in the order of addresses.

Repetition of the foregoing processing leads to completion of data writing to the second buffer unit 32. In other words, when the addresses of the write address counter 351 contained in the measurement data recording control unit 35 are counted up to the end, the counter count-up detection unit 352 detects the count-up of addresses (Step 605) to output a set signal of the buffer unit status flag 34 (Step 606). The set signal is transmitted through the write side flag change-over switch 45 of the buffer unit status flag to the second buffer unit status flag 34 to change the same into the set state. Meanwhile, the output of the counter count-up detection unit 352 is sent to the switch change-over control unit 353 as well. The switch change-over control unit 353 responsively executes control for switching the change-over switches 41 to 46 to the "b" side (Step 607).

As a result of the foregoing processing, the first buffer unit status flag 33 connected to the "b" side of the write side flag change-over switch 45 of the buffer unit status flag is input to the write control unit 354. In a case where the first buffer unit status flag 33 is reset, the measuring and analyzing information processor 20 thereafter executes the same operation as in the foregoing description for switching the second buffer unit 32 to the first buffer unit 31, the second buffer unit status flag 34 to the first buffer unit status flag 33, the second address change-over switch 44 to the fist address change-over switch 43 and the change-over switches 41–46 from the "a" to "b" side, thereby writing measurement data to the first buffer unit 31.

On the other hand, when the write control unit 354 of the measurement data recording control unit 35 checks to find that the buffer unit status flag is set, which indicates that processing, as will be described in the following, of transferring measurement data from the buffer unit to a buffer region in the main storage unit, is yet to be completed, the write control unit 354 stops outputting the write indication signal WI.

As a result of the foregoing processing, the probe data PD and the probe address PA output from the measuring object information processor 10 are added to the time stamp information TI from the clock counter 52 and alternately written in the first buffer unit 31 and the second buffer unit 32 in the measuring and analyzing information processor 20.

The measurement data (probe data PD, probe address PA and time stamp information TI) stored in the buffer units 31 and 32 in the measuring and analyzing information processor 20 through the above-described processing are transferred to main storage buffer regions 23 and 24 in the main storage unit according to the processing to be described below.

The following description will be made of operation immediately after the change-over switches 41–46 are switched to the "a" side as shown in FIG. 1, that is, immediately after the switching of the switches 41–46 to the "a" side after measurement data writing to the first buffer unit 31 is completed and then the measurement data recording control unit 35 sets the first buffer unit status flag 33 by means of the write side flag change-over switch 45 of the first buffer unit status flag 33.

Figure 7:
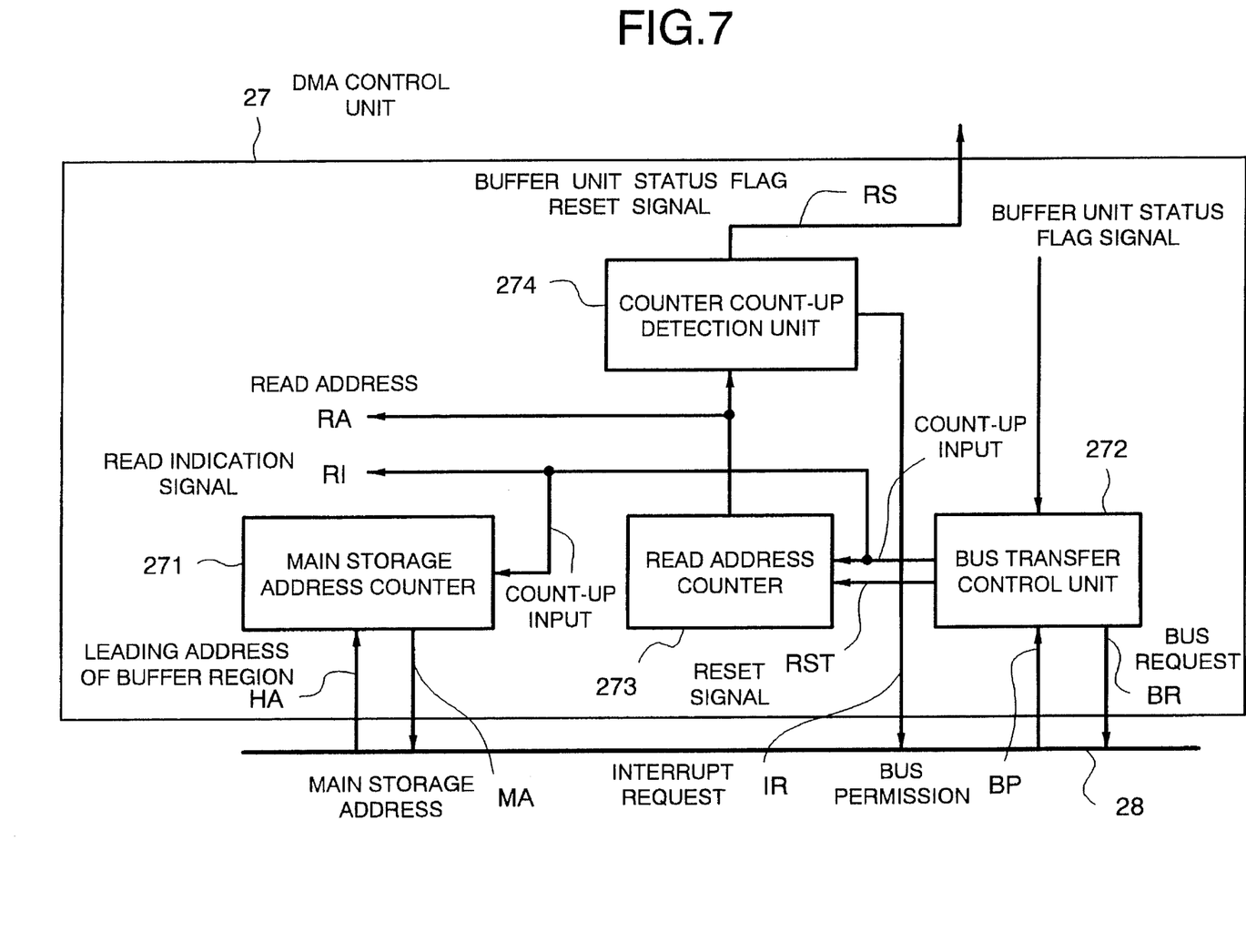
FIG. 7 is a block diagram showing an arrangement of a DMA control unit in the information processor operation measuring and analyzing system shown in FIG. 1.

The unit which executes processing of transferring measurement data in the buffer unit to the main storage buffer regions 23 and 24 in the main storage unit 22 is the DMA control unit 27. The internal arrangement of the DMA control unit 27 is illustrated in FIG. 7. The DMA control unit 27 comprises a main storage address counter 271, a bus transfer control unit 272, a read address counter 273 and a counter count-up detection unit 274 for detecting count-up of addresses of the read address counter 273. The counter count-up detection unit 274 detects the addresses being counted up to the end when an address of the read address counter 273 coincides with ceiling values of the addresses of the buffer units 31 and 32. Similarly to ordinary DMA operation, the DMA control unit 27 is already activated by an instruction from the processor 21 in the measuring and analyzing information processor 20. In this activation processing, leading addresses of the main storage buffer regions 23 and 24 in the main storage unit are set to the main storage address counter 271.

Figure 8:
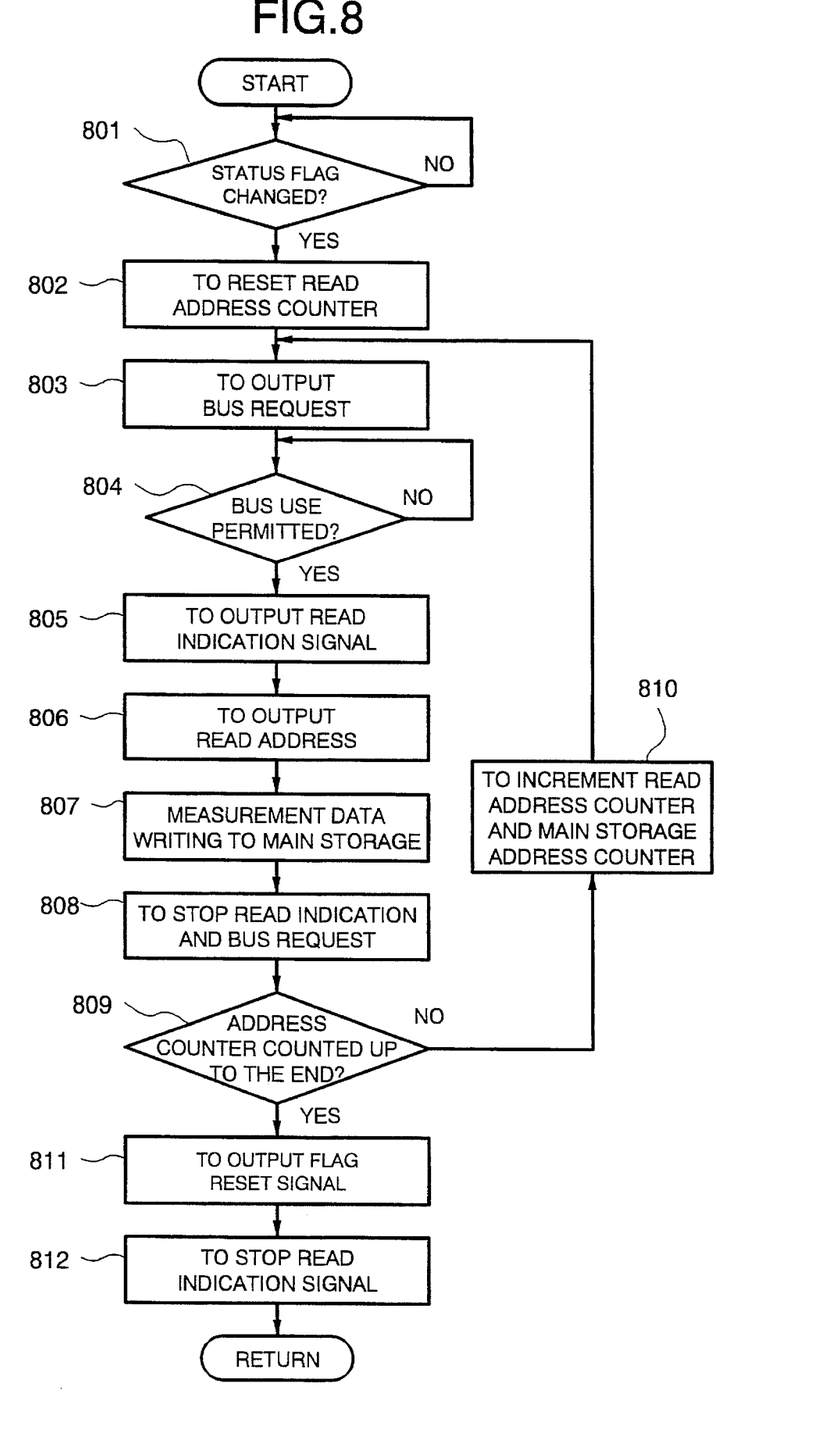
FIG. 8 is a flow chart illustrating operation of the DMA control unit in the information processor operation measuring and analyzing system shown in FIG. 1.

Operation of the DMA control unit 27 will be described with reference to the flow chart of FIG. 8.

As is described here, the main storage address counter 271, immediately after switching of the change-over switches 41–46 to the "a" side, has a leading address of the first main storage buffer region 23 set by the processor 21 in advance. First, the bus transfer control unit 272 constantly monitors the buffer unit status flags 33 and 34 connected to the read side flag change-over switch 46.

As a result of the above-described switching of the change-over switches 41–46 to the "a" side, the buffer unit status flag monitored by the bus transfer control unit 272 switches from the second buffer unit status flag 32 being reset to the first buffer unit status flag 33 being set, whereby the buffer unit status flag signal input to the bus transfer control unit 272 through the read side flag change-over switch 46 enters the set state from the reset state. Upon detection of this change (Step 801), the bus transfer control unit 272 outputs a reset signal RST to the read address counter 273 to reset the same (Step 802).

Thereafter, the bus transfer control unit 272 outputs a bus request BR to the bus 28 of the measuring and analyzing information processor 20 as is done in conventional DMA processing (Step 803). When the bus request BR is accepted and a bus permission BP is obtained (Step 804), the bus transfer control unit 272 outputs a read indication signal RI to the buffer unit and the bus interface unit 26 (Step 805).

When the change-over switches 41–46 are being switched to the "a" side, the read indication signal RI and the read address RA output from the read address counter 273 are applied to the first buffer unit 31 through the first address change-over switch 43 (Step 806).

The first buffer unit 31 responsively outputs measurement data recorded at a storage position indicated by the read address RA to the measurement data read source change-over switch 42. The measurement data is output to the bus 28 of the measuring and analyzing information processor 20 via the bus interface 26.

At this time, a main storage address MA indicated by the main storage address counter 271 is simultaneously output onto the bus 28. As a result, the measurement data is ultimately written at a position in the main storage buffer region indicated by the main storage address MA (Step 807).

Upon completion of transfer of one measurement data by the foregoing procedure, the bus transfer control unit 272 holds off output of the bus request BR and the read indication signal R1 (Step 808). Here, the counter count-up detection unit 274 determines, every time transfer of one measurement data is completed, whether the addresses of the read address counter 273 are counted up to the end or not (whether transfer of all measurement data is completed or not)(Step 809), and when the counter count-up detection unit 274 fails to detect the addresses being counted up to the end, the read address counter 273 and the main storage address counter 271 are incremented (Step 810).

Repetition of the foregoing processing results in that measurement data recorded in the buffer unit 33 are sequentially (in time series) written in the main storage buffer region 23 in the main storage unit 22 via a transfer path 62.

The measuring and analyzing information processor 20 according to the present embodiment contains the main storage address counter 271 indicating a write destination address (main storage address MA) of measurement data in the main storage unit 22 and the main storage address counter 271 is incremented every time data transfer is conducted. While the information processor 20 is structured to change a write destination address of measurement data in the main storage unit 22 by the incrementation, it is possible to use a part of a read address RA output from the read address counter 273 as a part of an address indicating a write position in the main storage buffer region 23 of the main storage unit 22 to omit providing the main storage address counter 271.

Following the above-described procedure, all the measurement data recorded in the first buffer unit 31 are transferred to the first main storage buffer region 23 in the main storage unit 22. Upon completion of the transfer, that is, when the addresses of the read address counter 273 are counted up to the end (Step 809), the counter count-up detection unit 274 detects it to output the reset signal RS of the buffer unit status flag (Step 811), as well as generating an interrupt request IR for notifying the processor 21 of the measuring and analyzing information processor 20 of the end of the DMA operation (Step 812). The reset signal RS for the buffer unit status flag is added to the first buffer status flag 33 through the read side flag change-over switch 46, whereby the first buffer unit status flag 33 is reset.

Upon accepting interruption and recognizing the end of the DMA operation, the processor 21 of the measuring and analyzing information processor 20 sets a leading address of the second main storage buffer region 24 to the main storage address counter 271 to start next DMA operation.

The description has been given of operation in a case where the change-over switches 41–46 are being switched to the "a" side. In a case where these switches are being switched to the "b" side, the measuring and analyzing information processor 20 executes operation for switching the first buffer unit 31 to the second buffer unit 32, the first buffer unit status flag 33 to the second buffer unit status flag 34, the main storage buffer region 23 to the second main storage buffer region 24, and the first address change-over switch 43 to the second address change-over switch 44 in the procedure described above. This operation leads to execution of transfer of measurement data from the second buffer unit 32 to the main storage buffer region 24.

As a result of the foregoing processing operation, measurement data recorded in the buffer unit is alternately transferred to the first main storage buffer region 23 and the second main storage buffer region 24 in the main storage unit 22 of the measuring and analyzing information processor 20.

When measurement data transfer is completed from the buffer unit to the main storage buffer in the main storage unit 22 of the measuring and analyzing information processor 20 and the DMA control unit 27 generates an interruption to the processor 21 of the measuring and analyzing information processor 20, the processor 21 activates data transfer from the buffer region in the main storage to the magnetic disk device 25. Processing of transferring measurement data existing in the main storage unit 22 to the magnetic disk device 25 is the same as the data transfer processing executed by a conventional information processor.

In addition, this data transfer can be conducted along with data transfer from the buffer unit to the buffer region in the main storage. More specifically, when data transfer is being executed from the first buffer unit 31 to the first main storage buffer region 23 following the above-described procedure, data transfer is simultaneously possible from the second main storage buffer region 24 to the magnetic disk device 25.

According to the above-described procedure, the measuring and analyzing information processor 20 records, in the magnetic disk device 25, probe data indicative of generation of a software event output from the measuring object information processor 10 and time stamp information indicative of the write time as time series data. The time series data recorded in the magnetic disk device 25 is read out to the processor 21 through the read path 64 from the magnetic disk device by executing the analysis program installed in the measuring and analyzing information processor 20 after measurement.

In the analysis program, when in analyzing data output from the software probe shown in FIG. 2, for example, an elapsed time from the start until the end of the procedure A is determined by obtaining a difference between a time added to data recording "a value indicative of the start of the procedure A" and a time added to data recording "a value indicative of the end of the procedure A". In other words, by obtaining a difference between time information in measurement data written in the magnetic disk device, an elapsed time is checked from when a software event occurs until when a next software event occurs in the information processor as the measuring object. This makes possible analyses of the state of operation of the measuring object information processor.

Although the present invention has been described in detail with respect to the preferred embodiment in the foregoing, the present invention is not limited to this embodiment. For example, while the present embodiment employs the registers 132 and 133 mapped in the input and output space of the measuring object information processor 10 as specific hardware resources to which the software probe is written, it will be apparent that the present invention is also applicable to a case where a specific region in a main storage space in the measuring object information processor 10 is used and the address detection unit 130 is connected to the main storage unit 12 mounted in this information processor 10.

The present embodiment has been described, with the size and the number of the buffer unit and the buffer region in the main storage being equal to each other and a volume of data transferred from the buffer unit to the buffer region in the main storage and a volume of data written from the buffer region in the main storage into the magnetic disk device by one-time DMA activation being equal to each other. It will be also apparent that the present invention is applicable to a measuring and analyzing information processor in which, for example, a size of a buffer unit is different from that of a buffer region in a main storage and a plurality of DMA activations are required to transfer all the data recorded in the buffer unit.

While the measuring and analyzing information processor according to the present embodiment is realized by providing a buffer unit and the like in a general purpose information processor and arranging a main storage buffer region also in a main storage unit, the present invention is also applicable to an arrangement in which there are separately provided a non-volatile recording device such as a magnetic disk device or an optical magnetic disk device which requires preparation time such as a seek time, a rotation waiting time or the like at the time of write, an information processor equipped with two or more sets of buffer units constituted by a random accessible high-speed memory, and an analyzing device which receives and analyzes time series data recorded in the non-volatile recording device.

As described in the foregoing, the present invention can enables time series acquisition of long-time software operation, that is, software events of a measuring object information processor with reduced overhead by two-stage buffer arrangement. In addition, a low-cost information processor operation measuring and analyzing system can be provided by the present invention, which is capable of checking a time of software event occurrence and an elapsed time between software events with high precision. This enables measurement and analyses of operation of an information processor through easy and simple operation. While conventional low-cost measuring devices are not capable of examining software operation of a measuring object information processor over a long period of time, the present invention allows a low-cost measuring device to examine long-time software operation of an information processor as a measuring object. Conventional measuring devices are expensive because of the need of random accessible high-speed memory with a large capacity to examine long-time software operation. On the other hand, the device of the present invention capable of examining long-time software operation without a random accessible high-speed memory with a large capacity enables a low cost information processor operation measuring and analyzing system which is capable of checking an elapsed time between software events with high precision.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. An information processor operation measuring and analyzing system which measures an interval of occurrences of a software event as a measuring object, comprising:

a measuring object information processor which comprises means, responsive to execution of a predetermined software probe which is incorporated in software in response to the occurrence of said measuring object in the software, for outputting data information on said software event, address information of the data information and a write indication signal for indicating write of said data information and address information; and a measuring and analyzing information processor which comprises a plurality of buffers for storing said data information and said address information together with time information as measurement data;

write control means for writing said measurement data into said plurality of buffers in response to said write indication signal;

measurement data storage means for storing the measurement data written in said buffers in time series order; and transfer control means for reading out measurement data from one of said buffers to which write is completed and transferring the measurement data to said measurement data storage means.

2. The information processor operation measuring and analyzing system according to claim 1, wherein said measuring object information processor further comprises hardware to which information indicative of a start and an end of said software event and information necessary for checking activation conditions, the state of execution and execution results of said software is written as said data information in response to execution of said software probe, said output means outputting said data information written in said hardware and a write address to said hardware as said address information, and said measuring and analyzing information processor further comprises clock counter means for outputting time information as a time stamp of said data information and address information.

3. The information processor operation measuring and analyzing system according to claim 2, wherein said output means of said measuring object information processor comprises:

means for detecting a write address to said hardware generated by the execution of said software probe, and means for indicating write of said data information and said write address to said hardware, and said output means outputs said data information and said write address written in said hardware and a write indication signal generated by said write indication means.

4. The information processor operation measuring and analyzing system according to claim 1, wherein said measuring and analyzing information processor further comprises holding means for holding a flag indicating whether write of said measurement data is completed or not for each of said plurality of buffers, said write control means writes said measurement data to said buffer to which write is not yet completed and sets said flag corresponding to said buffer to which write is completed to the write completion state with reference to said flag for each of said buffers, and said transfer control means reads said measurement data from said buffer in the write completion state and sets said flag corresponding to said buffer from which said measurement data reading is completed to the write incompletion state with reference to said flag for each of said buffers.

5. The information processor operation measuring and analyzing system according to claim 4, wherein said measuring and analyzing information processor further comprises switching means for alternately switching said buffer to which said measurement data is to be written by said write control means and said buffer from which said measurement data is to be read by said transfer control means, and said write control means comprises switching control means for switching said switching means of said buffer having its corresponding flag in the measurement data reading incompletion state to the write side of said measurement data and switching said switching means of said buffer having its corresponding flag in the measurement data writing completion state to the read side of said measurement data.

6. The information processor operation measuring and analyzing system according to claim 4, wherein said write control means of said measuring and analyzing information processor comprises write count-up detection means for detecting write addresses to said buffer to which said measurement data is written, which are being counted up to the end, said write count-up detection means, upon detecting count-up to the end of write addresses of said buffer to which said measurement data is written, setting said flag corresponding to said buffer to the write completion state, and said transfer control means of said measuring and analyzing information processor comprises read count-up detection means for detecting read addresses to said buffer from which said measurement data is read, which are being counted up to the end, said read count-up detection means, upon detecting count-up to the end of read addresses of said buffer from which said measurement data is read, setting said flag corresponding to said buffer to the write incompletion state.

7. The information processor operation measuring and analyzing system according to claim 4, wherein said write control means of said measuring and analyzing information processor comprises:

address counting means for counting up write addresses of said measurement data to said buffer in response to said write indication signal, and count-up detection means for detecting the write address to said buffer which are being counted up to the end and setting said flag corresponding to said buffer to the write completion state, said transfer control means of said measuring and analyzing information processor comprises:

address counting means for counting up read addresses of said measurement data to said buffer, and count-up detection means for detecting the read addresses to said buffer which are being counted up to the end and setting said flag corresponding to said buffer to the write incompletion state.

8. An information processor operation measuring and analyzing system which measures an interval of occurrences of a software event as a measuring object, comprising:

a measuring object information processor which comprises means responsive to execution of a predetermined software probe incorporated in a software in response to the occurrence of said measuring object in the software for outputting data information on said software event, address information of the data information and a write indication signal for indicating write of said data information and address information, and a measuring and analyzing information processor which comprises a plurality of first buffers for storing said data information and address information together with time information as measurement data, write control means for writing said measurement data into said plurality of first buffers in response to said write indication signal, a plurality of second buffers for storing said measurement data read from said first buffers, transfer control means for reading measurement data out of said first buffer to which write is completed to transfer the read measurement data to said second buffer, measurement data storage means for writing and storing, in time series order, said measurement data transferred to said second buffer, wherein write of said measurement data to said first buffer, transfer of said measurement data from said first buffer to said second buffer, and write of said measurement data from said second buffer to said measurement data storage means are executed in parallel to each other.

9. The information processor operation measuring and analyzing system according to claim 8, wherein said measuring object information processor further comprises hardware to which information indicative of a start and an end of said software event and information necessary for checking activation conditions, the state of execution and execution results of said software is written as said data information in response to execution of said software probe, said output means outputting said data information written in said hardware and a write address to said hardware as said address information, and said measuring and analyzing information processor further comprises clock counter means for outputting time information to be a time stamp of said data information and address information.

10. The information processor operation measuring and analyzing system according to claim 9, wherein said output means of said measuring object information processor comprises:

means for detecting a write address to said hardware generated by the execution of said software probe, and means for indicating write of said data information and said write address to said hardware, and said output means outputs said data information and said write address written in said hardware and a write indication signal generated by said write indication means.

11. The information processor operation measuring and analyzing system according to claim 8, wherein said measuring and analyzing information processor further comprises holding means for holding a flag indicating whether write of said measurement data is completed or not for each of said plurality of first buffers, said write control means writes said measurement data to said first buffer to which write is not yet completed and sets said flag corresponding to said first buffer write to which is completed to the write completion state with reference to said flag for each of said first buffers, and said transfer control means reads said measurement data from said first buffer in the write completion state and sets said flag corresponding to said buffer from which said measurement data reading is completed to the write incompletion state with reference to said flag for each of said first buffers.

12. The information processor operation measuring and analyzing system according to claim 11, wherein said measuring and analyzing information processor further comprises switching means for alternately switching said first buffer to which said measurement data is to be written by said write control means and said first buffer from which said measurement data is to be read by said transfer control means, and said write control means comprises switching control means for switching said switching means of said first buffer having its corresponding flag in the measurement data reading incompletion state to the write side of said measurement data and switching said switching means of said first buffer having its corresponding flag in the measurement data writing completion state to the read side of said measurement data.

13. The information processor operation measuring and analyzing system according to claim 11, wherein said write control means of said measuring and analyzing information processor comprises write count-up detection means for detecting write addresses to said first buffer to which said measurement data is written, which are being counted up to the end, said write count-up detection means, upon detecting count-up to the end of write addresses of said buffer to which said measurement date is written, setting said flag corresponding to said first buffer to the write completion state, and said transfer control means of said measuring and analyzing information processor comprises read count-up detection means for detecting read addresses to said first buffer from which said measurement data is read, which are being counted up to the end, said read count-up detection means, upon detecting count-up to the end of read addresses of said first buffer from which said measurement data is read, setting said flag corresponding to said buffer to the write incompletion state.

14. The information processor operation measuring and analyzing system according to claim 11, wherein said write control means of said measuring and analyzing information processor comprises:

address counting means for counting up write addresses of said measurement data to said first buffer in response to said write indication signal, and count-up detection means for detecting the write addresses to said first buffer being counted up to the end to set said flag corresponding to said first buffer to the write completion state, and said transfer control means of said measuring and analyzing information processor comprises:

address counting means for counting up read addresses of said measurement data to said first buffer, and count-up detection means for detecting the read addresses to said buffer being counted up to the end to set said flag corresponding to said first buffer to the write incompletion state.

* * * * *